United States Patent Office 3,423,947
Patented Jan. 28, 1969

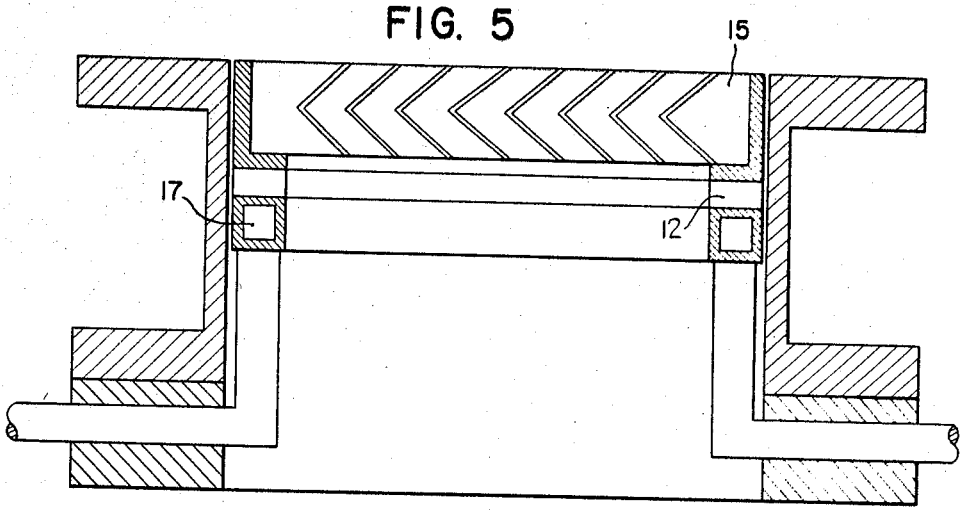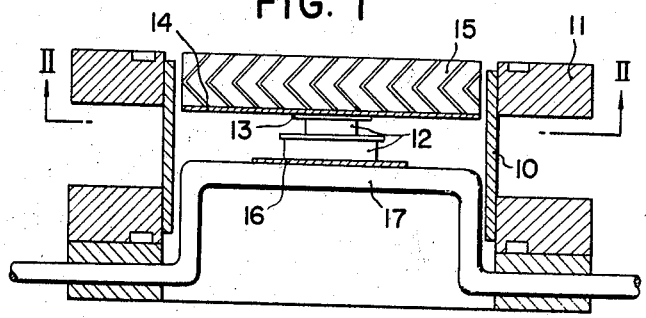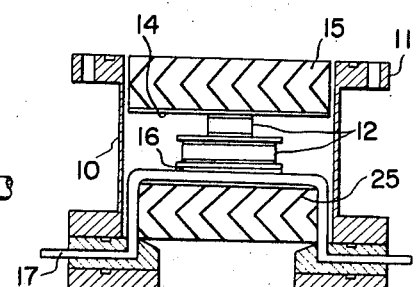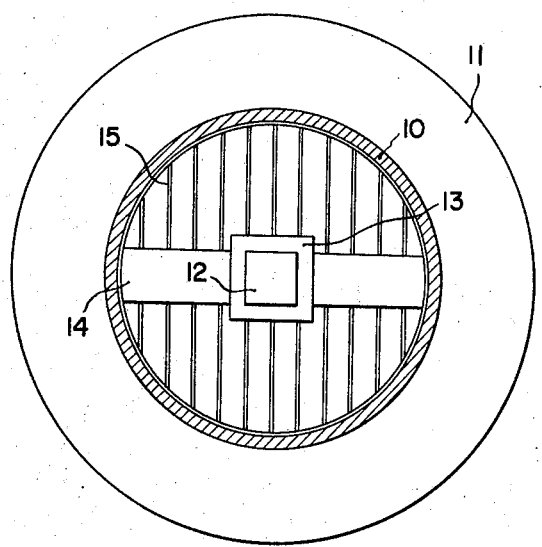

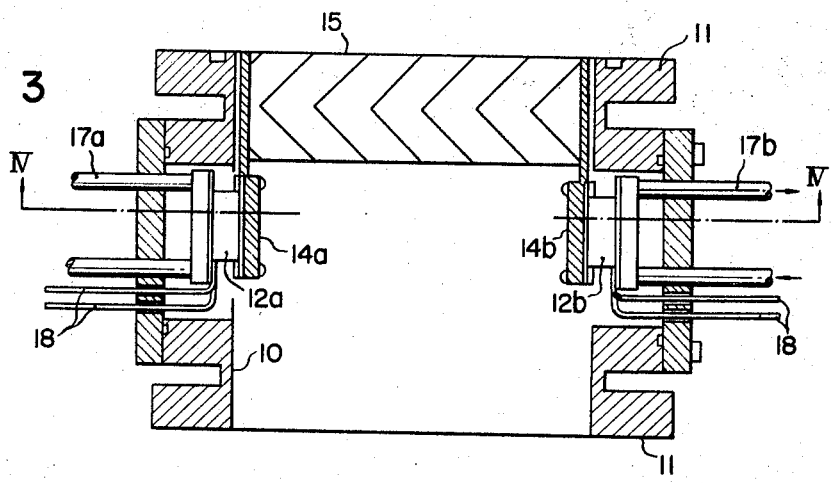
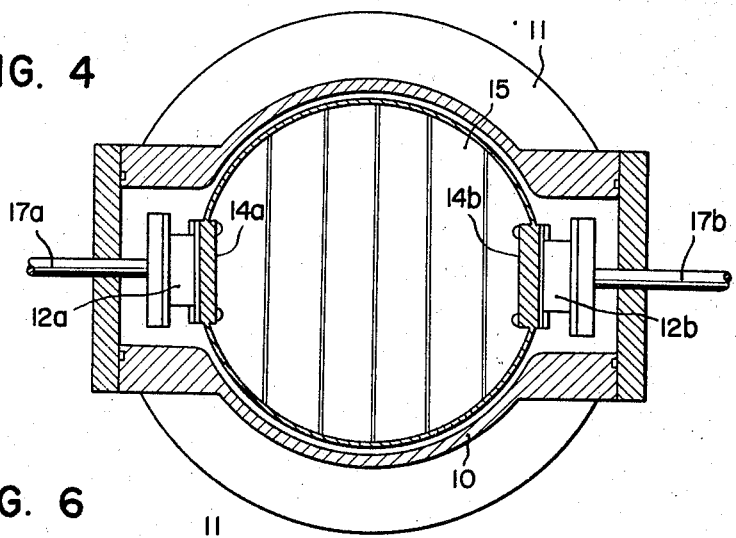
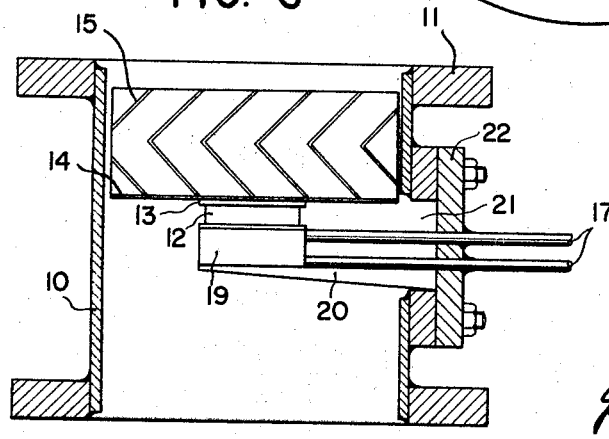

3,423,947
VACUUM TRAPS UTILIZING ELECTRONIC REFRIGERATING ELEMENTS
Yosimaro Moriya 15–23, 4-chome, Omori-kita, Ota-ku, Tokyo-to, Japan
Filed July 17, 1967, Ser. No. 653,715
U.S. Cl. 62—3                                7 Claims
Int. Cl. F25b 21/02; B01d 5/00

ABSTRACT OF THE DISCLOSURE

A cooling baffle acting as a vacuum trap and an electronic refrigerating element to cool the baffle are contained in an evacuation pipe in spaced relationship therefrom and are supported by the wall of the evacuation pipe by means of a cooling pipe extending through the wall. A second cooling baffle may be provided on the vacuum pump side and arranged to be supported and cooled by the cooling pipe, said second cooling baffle serving to condense the operating vapour of a vapour diffusion pump and to return the condensate back to a boiler of the pump.

---

This invention relates to vacuum traps utilizing electronic refrigerating elements and more particularly to vacuum pump devices utilizing such vacuum traps.

With the recent advance in vacuum devices such as electron microscopes, demand for vacuum pump devices capable of producing high vacuum has increased. In many cases, as the vacuum pump device, an oil or mercury vapour diffusion pump is used singly or in series with a low pressure pre-pump, and a cooling means is provided in an evacuating pipe interconnecting the pump device and the device to be evacuated to decrease the vapour pressure in the evacuating pipe, thus increasing the efficiency of exhausting. Where liquid air or liquid nitrogen is used as the cooling means low temperatures of about $-180°$ C. to $-190°$ C. can be obtained, whereas when a mixture of Dry Ice and ethyl alcohol is used a low temperature of $-72°$ C. can be obtained. However, as it is necessary to supplement these chemical agents from time to time during operation of the cooling means, the running cost thereof is expensive. On the other hand, mechanical refrigerators can produce low temperatures of only about $-40°$ C., and even with a two stage type refrigerator, the maximum low temperatures attainable are at most about $-80°$ C., and yet the cost of installation is expensive. Actually, however, there are many applications requiring temperautres intermediate between said two limits, i.e., low temperatures ranging from about $-80°$ C. to about $-120°$ C. and corresponding degrees of vacuum. As an approach to this problem, it has been proposed to employ electronic refrigerating elements as the cooling means. According to one prior proposal, an electronic refrigerating element is disposed in the evacuating pipes, a plurality of cooling fins extending at right angles with respect to the exhaust passage are provided for the cold junction of the element, and the hot junction of the element is extended through the wall of the evacuating pipe to constitute a portion thereof and is cooled from outside by means of a freezing agent such as Dry Ice and the like. This arrangement also requires constant supplement of the freezing agent, thus making difficult automatic operation of the device. Moreover, as the hot junction of the electronic refrigerating element is in heat transfer relation with the wall of the evacuation pipe having a wide surface area, the freezing agent is required to absorb heat transmitted from said pipe wall in addition to the heat generated at the hot junction, whereby the efficiency is decreased.

According to another prior arrangement, the electronic refrigerating element is disposed on the outside of an evacuation pipe and a baffle is installed in the evacuation pipe in the diametrical direction thereof and connected to the cold junction of the electronic refrigerating element through a heat conductor bar extending through the wall of the evacuation pipe. With this arrangement, however, the electronic refrigerating element is liable to be mechanically damaged, and, in addition, it is necessary to support the heat conductor by a vacuum-tight and thermally non-conductive means.

In the vacuum pump device, such as an oil diffusion pump utilizing vapour of oil or mercury as the operating liquid, in order to prevent the vapour of mercury or oil, ordinarily in the form of purified mineral oil or a silicone oil, from flowing back into the device being evacuated through the evacuating pipe, it is necessary to install trap means comprising baffles of various types which are constructed and arranged to permit free passage of evacuated gas but serve to condense the operating fluid of the pump whereby to prevent such operating fluid from flowing back into the device being evacuated and to cause condensed operating fluid to return back to the boiler of the pump, thus preventing shortage thereof.

Further, an additional baffle is provided on the high vacuum side for the purpose of trapping back flow of the operating vapour having a vapour pressure corresponding to the operating temperature of the baffle. In certain applications such an additional trap functions as a type of pump by trapping water vapour and the like liberated from the vacuum devices to be evacuated. Heretofore, these baffles were cooled by mechanical refrigerators, liquid nitrogen and the like in order to condense the operating fluid of the pump.

One object of this invention is to provide an improved vacuum trap which utilizes an electronic refrigerating element and which can operate at high efficiencies to provide required low temperatures with relatively low electric power.

Another object of this invention is to provide a novel vacuum trap capable of effectively cooling the baffle with relatively simple refrigerating apparatus and without the necessity of supplementing a freezing agent consisting of chemicals.

According to one aspect of this invention, an electronic refrigerating element is installed in an evacuating pipe and is spaced from the well polished inner surface thereof. A baffle of the chevron type or of any other desired type is mounted on the cold junction of the electronic refrigerating element to be cooled thereby, and a cooling pipe is mounted on the hot junction. The baffle-electronic refrigerating element assembly is supported by the evacuation pipe only through this cooling pipe. As a result, the baffle is effectively cooled by the electronic refrigerating element, and, as the quantity of heat transmitted thereto from the highly polished evacuating tube by radiation through the evacuated space is small, it is possible to sufficiently cool the baffle to low temperatures with the refrigerating element energized by low electric power. Moreover, as the hot junction of the electronic refrigerating element is supported by the wall of the evacuating pipe only through the cooling pipe, it is possible to cool the hot junction thereof substantially independently of said pipe wall, whereby it is possible to provide desired low temperatures with relatively simple cooling or refrigerating apparatus. If desired, a number of electronic refrigerating elements may be used to increase the cooling capacity of the baffle.

Where the electronic refrigerating element or elements are used in this manner, the excessively low temperature created at the baffle results in an increase in the viscosity or solidification of the operating fluid of the pump condensed thereby, so that the condensate cannot return by gravity to the boiler of the pump, thus causing shortage of the operating fluid in the boiler. Further, such highly viscous or solidified condensate clogs the baffle to impair the evacuation effect.

It is therefore a further object of this invention to effectively cool a baffle that comprises a vacuum trap by means of an electronic refrigerating element which can eliminate the above described trouble encountered in a vacuum pump device utilizing a vapour diffusion pump and an electronic refrigerating element.

Thus, in accordance with another aspect of this invention, an electronic refrigerating element is installed in an evacuating pipe interconnecting a vapour diffusion pump and a vacuum device to be evacuated to cool a baffle by the cold junction of the element which is located on the side of the vacuum device. A second baffle is associated with the hot junction of the element which is located on the side of the vapour diffusion pump, the arrangement being such that the second baffle is cooled to a relatively high temperature in order to permit the operating fluid of the pump condensed thereby to naturally flow down by gravity. With this arrangement the second baffle is effective for condensing the operating fluid of the pump thereby to prevent it from flowing back into the vacuum device being evacuated and to assure return of the condensate back to the pump, thus preventing shortage of the operating fluid thereof, whereas the first baffle is greatly cooled by the electronic refrigerating element, thus effectively decreasing the vapour pressure in the evacuating pipe to readily create high vacuum. Consequently, where mineral oil or a silicone oil is used as the operating fluid of the pump, the fluid that is supplied from outside to cool the second baffle may be water at a temperature of above 0° C. which can be provided by a simple means. This water is also effective for cooling the hot junction of the electronic refrigerating element.

As an example, in the case of an oil vapour diffusion pump, as the vapour pressure of oil vapour is generally less than $10^{-9}$ torr at $-30°$ C., it is possible to reduce to $10^{-9}$ torr the vapour pressure of the operating fluid of the pump on the high vacuum side by cooling the second baffle with water and by cooling the first baffle to a temperature below at least $-30°$ C. with the electronic refrigerating element. In the case of a mercury vapour diffusing pump, it is necessary to cool the first baffle to a temperature close to $-38.8°$ C., or the melting point of mercury, and to cool the second baffle to a temperature below at least $-75°$ C. corresponding to $10^{-9}$ torr, the vapour pressure of mercury.

For a more complete understanding of this invention reference may be had to the following detailed description in connection with the accompanying drawings, in which:

FIG. 1 is a longitudinal sectional view of one embodiment of the vacuum trap employing an electronic refrigerating element in accordance with this invention;

FIG. 2 is a cross-sectional view of the vacuum trap shown in FIG. 1, taken along a line II and viewed in the direction of the arrows;

FIG. 3 is a longitudinal sectional view of a modified vacuum trap;

FIG. 4 is a cross-sectional view of FIG. 3, taken along a line IV—IV;

FIG. 5 is a longitudinal cross-sectional view of a modified embodiment;

FIG. 6 is a cross-sectional view of another embodiment of the vacuum trap; and

FIG. 7 is a diagrammatic longitudinal sectional view of a vacuum pump embodying this invention.

Referring now to FIGS. 1 and 2 of the accompanying drawing, 10 indicates an evacuating pipe provided with flanges 11 at its upper and lower ends. The inner surface of pipe 10 is highly polished to minimize heat transmission by radiation. Although not shown in the drawing, upper flange 11 is connected to a vacuum device to be evacuated such as an electron microscope, and the lower flange is connected to a vacuum pump device such as an oil diffusion pump as will be described later in connection with FIG. 7. Inside the evacuation tube and spaced from the inner wall thereof is housed an electronic refrigerating element 12 of one or two stage type (FIG. 1 shows the later type). A baffle 15 of any suitable configuration is mounted on the cold junction plate 13 of the element through a cooling plate 14, whereby the baffle is cooled by the electronic refrigerating element. Although the illustrated baffle is one of the so-called chevron type including a plurality of spaced metal plates in the form of chevrons, there are many other types which can be utilized as the baffle of this invention. For example, in one type a plurality of horizontal annuli of different diameters are superposed in the vertical direction but spaced from each other, in another type a plurality of frustoconical cylinders of different diameters are disposed concentrically but mutually spaced in the horizontal direction, in yet another type a metal strip inclined to the vertical is wound into a cone with gradually increasing radii, and in a still further type two groups of parallel plates inclined in the opposite directions are arranged in staggered relation. Thus, it is to be understood that the invention is not limited to any particular type of the baffle acting as the trap and that any baffle may be used provided that it is constructed in such a manner that it permits free flow of gas from the device but affords bent passage for the operating vapour of the vacuum pump, thus condensing the vapour. A cooling pipe 17 is provided to thermally contact the hot junction plate 16 of electronic refrigerating element. The opposite ends of the cooling pipe hermetically extend through the wall of evacuating pipe 10 and are connected to a source of cooling fluid, not shown.

Thus, in accordance with this invention, cooling baffle 15 and the electronic refrigerating element 17 adapted to cool it are supported by the wall of the evacuating pipe only through cooling pipe 17 so that by polishing well the inner surface of the evacuating pipe, the vacuum trap and the refrigerating element which are contained in vacuum are as if they were placed in a Thermos bottle. Consequently, cold junction plate 13, cooling plate 14 and cooling baffle 15 will be heated only by the heat of radiation from the inner wall of evacuation pipe 10 and the heat of conduction from hot junction plate 16. If the inner surface of the evacuation pipe is highly polished as mentioned above, the heat of radiation in vacuum will be negligibly small. Further, by bending the cooling pipe 17 into a U shape configuration, heat conduction from the wall of the evacuation pipe to the electronic refrigerator element through the cooling pipe is caused to be far smaller than that in the case where the cold junction is fitted in the wall as a portion thereof. Further, by forming the portion of the wall of the evacuation pipe through which the cooling pipe extends with a ceramic material, stainless steel or other thermally nonconductive material, the heat of conduction through the cooling pipe can be more effectively reduced. As a result, when the hot junction of the refrigerating element is cooled to a temperature within a range of from $-30°$ C. to $-100°$ C., it is possible to maintain the vacuum trap at the desired temperature by energizing the element with relatively low power. In a single stage type electronic refrigerating element, when the hot junction is maintained at 30° C., the cold junction is cooled to $-40°$ C., whereas in a two stage cascade type electronic refrigerating element, the hot junction maintained at 30° C. results in $-70°$ C. at the cold junction. Further, in the two stage type, the hot junction maintained at $-50°$ C. results in approximately $-115°$ C. at the cold junction. When the temperature at the cold junction is lowered below $-100°$ C., the trap can work effectively for water vapour.

It will be obvious to those skilled in the art that the cooling fluid flowing through cooling pipe 17 may be water at room temperature, a refrigerant cooled by a refrigerator, or any other suitable cooling medium which is selected in accordance with the requisite temperatures at the cold junction and the baffle and, hence, the desired vacuum to be attained.

While the configuration of electronic refrigerating element 12 shown in FIG. 2 is a square, it may be an elongated rectangular, a grid form or a crisscross where the diameter of the evacuation pipe is large and where it is desired to decrease evacuation resistance.

FIGS. 3 and 4 illustrate a modified embodiment of this invention wherein a plurality of electronic refrigerating elements 12a and 12b are employed which are disposed vertically along the inner periphery of evacuation pipe 10. In this case cooling baffle 15 is supported by vertical extensions of cooling plates 14a and 14b of elements 12a and 12b which are cooled by cooling medium flowing through cooling pipes 17a and 17b. Electric power is supplied to the refrigerating elements through lead wires 18. By increasing the number of refrigerating elements, the cooling effect provided by the baffle can also be increased. Although not shown in FIGS. 1 and 2, it is to be understood that the electronic refrigerating element is provided with electric lead wires 18, as shown in FIG. 3.

In the embodiment shown in FIG. 5, the electronic refrigerating element 12 is arranged in an annulus sandwiched between a chevron type trap 15 and a cooling pipe 17 of square cross-section. While in FIG. 5 the ends of cooling pipe 17 are diametrically opposite, they may be on the same side. This arrangement affords the maximum cooling effect with minimum evacuation resistance.

FIG. 6 shows another embodiment of this invention wherein an electronic refrigerating element 12 adapted to cool baffle 15 is supported by a hollow cooling box 19, which in turn is supported by a lid 22 through a pair of supporting arms 20, said lid closing a window 21 through evacuating pipe 10. Cooling pipe 17 connected to cooling box 19 extends through lid 22 and is welded thereto. To assemble the vacuum trap, the refrigerating element and the cooling box are inserted into the evacuating pipe through window 21, and then baffle 15 is mounted on the refrigerating element through the upper opening of the evacuating pipe. This embodiment permits easy assembling and disassembling of the trap.

FIG. 7 shows still further embodiment of this invention wherein a second baffle 25, which also may be of chevron type, is arranged on the side of a vapour diffusion pump 26 and cooled by cooling pipe 17 in order to condense the operating vapour of the pump and to return the condensate by gravity back to a boiler 27 of the pump.

In operation, vapour diffusion pump 26 is operated to evacuate the vacuum device concurrently with the energization of the electronic refrigerating element. Cooling fluid cooled to the desired temperature is passed through cooling pipe 17. When an electronic refrigerating element of two stage cascade type is employed, cooling of the hot joint by water at 30° C. creates a temperature of lower than −50° C. at the cold joint, whereas cooling of the hot joint to −30° C. cools the cold junction to a temperature of −100° C. Consequently, for the former hot junction temperature, mineral oil or mercury can be used as the operating fluid of the pump, whereas for the latter hot junction temperature, a low viscosity silicone oil and mercury can be used. With this arrangement the greater part of the vapour from the pump is condensed by the second baffle 25, and the condensate flows down along the inner wall of the pump back to boiler 27. However, a small quantity of vapour which is in vapour state at the temperature of baffle 25 migrates into the high vacuum side and trapped by the first trap 15. Thus, according to this embodiment the cooling fluid adapted to cool the hot junction of the electronic refrigerating element is utilized to cool the second baffle to condense the operating vapour of the diffusion pump and to return the condensate to the pump boiler. Further, the first baffle on the high vacuum side is cooled by the cold junction of the refrigerating element to provide low temperature and low temperature and low vapour pressure, whereby the desired high vacuum can be attained with a high efficiency with simple construction and low operating power for the electronic refrigerating element.

While the invention has been shown and described in connection with certain preferred embodiments thereof, it will be understood that many changes and modifications can be made without departing from the spirit and scope of the invention as defined in the appended claim.

What I claim is:

1. A vacuum trap comprising an evacuating pipe provided between a vacuum pump device and a vacuum device to be evacuated and having a highly polished inner surface, an electronic refrigerating element disposed in said evacuating pipe and spaced therefrom, a baffle supported and cooled by the cold junction of said electronic refrigerating element, said baffle being spaced from the inner surface of said evacuating pipe, and cooling means in heat transfer relation with the hot junction of said electronic refrigerating element including an inverted U-shaped pipe means to pass cooling medium, said hot junction of said electronic refrigerating element being maintained in heat transfer relation with the upper horizontal section of said pipe means and the opposite ends of said pipe means extending through the wall of said evacuating pipe to support said electronic refrigerating element and said baffle.

2. The vacuum trap according to claim 1 wherein said electronic refrigerating element comprises a plurality of circumferentially spaced electronic refrigerating units which are disposed vertically.

3. The vacuum trap according to claim 1 wherein said electronic refrigerating element is in the form of an annulus sandwiched between said baffle and said cooling means.

4. A vacuum trap comprising an evaporating pipe provided between a vacuum pump device and a vacuum device to be evacuated and having a highly polished inner surface, an electronic refrigerating element disposed in said evacuating pipe and spaced therefrom, a baffle supported and cooled by the cold junction of said electronic refrigerating element, said baffle being spaced from the inner surface of said evacuating pipe, and cooling means in heat transfer relation with the hot junction of said electronic refrigerating element, said cooling means including pipe means to pass cooling medium and extending through the wall of said evacuating pipe to support said electronic refrigearting element and said baffle, said electronic refrigerating element being carried by a cooling box which is supported by horizontal arms extending from a lid that closes a window through the side wall of said evacuating pipe.

5. A vacuum trap comprising an evacuating pipe provided between a vacuum pump device and a vacuum device to be evacuated and having a highly polished inner surface, an electronic refrigerating element disposed in said evacuating pipe and spaced therefrom, a first baffle supported and cooled by the cold junction of said electronic refrigerating element, said baffle being located on the side of said vacuum device to be evacuated with respect to said electronic refrigerating element and spaced from the inner surface of said evacuating pipe, cooling means in heat transfer relation with the hot junction of said electronic refrigerating element, said cooling means including pipe means to pass cooling medium and extending through the wall of said evacuating pipe to support the electronic refrigerating element and said first baffle, and a second baffle is provided on the pump side and arranged to be cooled by said cooling means.

6. A vacuum pump device comprising a vapour diffusion pump including a boiler to generate operating vapour of said pump, an evacuating pipe connecting said pump to a vacuum device to be evacuated, an electronic refrigerating element contained in said evacuating pipe, a first baffle cooled by the cold junction of said refrigerating element and located on the side of said vacuum device, means located on the pump side to cool the hot junction of said refrigerating element, a second baffle located on the pump side and cooled by said cooling means to condense said operating vapour and to cause the condensate to return under gravity to said pump boiler.

7. The vacuum pump device according to claim 5 wherein said first and second baffles and said electronic refrigerating elements are spaced from the inner surface of said evacuating pipe and supported thereby through said cooling means.

References Cited

UNITED STATES PATENTS

| 2,934,257 | 4/1960 | Power | 62—3 X |
| 3,010,285 | 11/1961 | Penn | 62—3 |
| 3,109,290 | 11/1963 | Kolenk | 62—3 |
| 3,137,551 | 6/1964 | Mark | 62—55.5 |

WILLIAM J. WYE, *Primary Examiner.*

U.S. Cl. X.R.

62—55.5